United States Patent [19]

Sorathia et al.

[11] Patent Number: 5,328,957

[45] Date of Patent: Jul. 12, 1994

[54] POLYURETHANE-ACRYLIC INTERPENETRATING POLYMER NETWORK ACOUSTIC DAMPING MATERIAL

[75] Inventors: Usman A. Sorathia, Arnold; Timothy L. Dapp, Bowie, both of Md.

[73] Assignee: The United States of America as represented by the Secretary of the Navy, Washington, D.C.

[21] Appl. No.: 758,972

[22] Filed: Aug. 28, 1991

[51] Int. Cl.$^5$ ............................................. C08F 8/30
[52] U.S. Cl. ............................. 525/123; 525/454; 525/455; 525/903
[58] Field of Search ............... 525/123, 454, 455, 903, 525/920; 523/400, 454

[56] References Cited

U.S. PATENT DOCUMENTS

| | | | |
|---|---|---|---|
| 3,894,169 | 7/1975 | Miller | 428/317.9 |
| 3,941,725 | 3/1976 | Schmittes et al. | 521/116 |
| 4,302,553 | 11/1981 | Frisch et al. | 525/903 |
| 4,613,543 | 9/1986 | Dabi | 521/137 |
| 4,766,183 | 8/1988 | Rizk et al. | 525/454 |

Primary Examiner—John Kight, III
Assistant Examiner—John M. Cooney, Jr.
Attorney, Agent, or Firm—Gary G. Borda; Luther A. Marsh

[57] ABSTRACT

Improved acoustic damping materials comprise interpenetrating polymer networks having a soft polymer component and a hard polymer component. The soft polymer component, constituting from 50 to 90 percent by weight of the material, is made by polymerizing an aromatic diisocyanate with a polyalkylene ether glycol, and the hard polymer component is an acrylic polymer made by polymerization of the alkyl esters and alkylene diesters of acrylic and/or methacrylic acid, e.g. n-butyl methacrylate and tetramethylene glycol dimethacrylate. The curing of the mixture is carried out at room temperature.

8 Claims, 1 Drawing Sheet

POLYURETHANE-ACRYLIC INTERPENETRATING POLYMER NETWORK ACOUSTIC DAMPING MATERIAL

The invention described herein may be manufactured and used by or for the Government of the United States for governmental purposes without the payment of any royalties thereon or therefor.

BACKGROUND OF THE INVENTION

1. Field of Invention

This invention relates to polymer compositions, and methods of preparing them, having improved acoustic damping properties. More specifically, it relates to polymer mixtures comprising two components, a soft polymer component and a hard polymer component, which are intimately mixed on a molecular scale, such mixtures being referred to as "interpenetrating polymer networks."

2. Description of the Prior Art

Interpenetrating polymer networks having improved acoustic damping characteristics are known to the art.

U.S. Pat. No. 3,833,404 discloses interpenetrating polymer networks to be used for surface layers or coatings for damping vibrations or noise-emitting surfaces. The material consists of poly ethylacrylate cross-linked with a polyglycol dimethacrylate, and polystyrene cross-linked with divinylbenzene.

U.S. Pat. No. 4,302,553 discloses a number of interpenetrating polymer networks having improved tensile strength and swelling properties in presence of solvents, including combinations of polyurethanes with polyacrylates, polyepoxides, polyesters, styrene-butadiene polymers and polydimethyl siloxanes.

U.S. Pat. No. 4,342,793 describes curable resin compositions for protective surface coatings consisting of interpenetrating polymer networks prepared from saturated polyols, acrylate and methacrylate esters, and polyisocyanates, by radiation and thermal curing.

U.S. Pat. Nos. 4,618,658 and 4,719,268 describe polymer modified epoxy resin compositions comprising the copolymerization product of an epoxy resin wherein part of the epoxide groups have been modified to provide polymerizable ethylenic unsaturation; vinyl-terminated urethane oligomer; and a polymerizable ethylenically unsaturated compound such as styrene or an acrylate ester.

U.S. Pat. No. 4,742,128 discloses compositions for molded products consisting of an interpenetrating polymer network comprising a polyamide and a polyurethane.

U.S. Pat. No. 4,752,624 describes an interpenetrating polymer network for selective permeation membranes comprising a hydrophilic and a hydrophobic polymer component. The hydrophylic component is made from hexamethylene diisocyanate and poly ethylene ether glycol, and cross-linked with trimethylolpropane. The hydrophobic polymer component is polystyrene cross-linked with divinylbenzene.

U.S. Pat. No. 4,766,183 discloses a heat-curable composition comprising a urethane/epoxy/silicone interpenetrating polymer network.

U.S. Pat. No. 4,824,919 describes vinyl ester/styrene composition flexibilized by the addition of a small amount of polyurethane.

U.S. Pat. No. 4,902,737 discloses a resin having improved impact properties comprising an aromatic carbonate resin/polyester blend modified by the addition of a first elastomeric phase of cross-linked polyacrylate, and a second phase of cross-linked styrene/acrylonitrile.

U.S. Pat. No. 4,923,934 discloses a coating having improved flexibility, resistance to chemical attack and corrosion, and adhesion, consisting of an interpenetrating polymer network including a blocked urethane prepolymer, a polyol, an epoxy resin, and an epoxy catalyst.

U.S. Pat. No. 4,957,981 describes a polymeric material to be used for optical products such as lenses, goggles, and watch covers comprising an interpenetrating polymer network of a polyol(allylcarbonate) and an epoxy resin.

U.S. Pat. No. 4,992,506 provides a molding composition having improved flexural modulus and softness (lower modulus) comprising an interpenetrating polymer network of one or more thermoplastic copolyetheresters, one or more aromatic thermoplastic polyesters, a rubbery polymer comprising cross-linked (meth)acrylate, and an interpenetrating cross-linked styrene resin; and, optionally, a mineral filler.

SUMMARY OF THE INVENTION

The acoustic damping properties of viscoelastic polymeric materials render them most effective in their glass transition temperature range where the material changes from hard, glass-like to soft, rubbery consistency. For a particular polymeric material, the glass transition temperature range is centered about a characteristic temperature for that material. For most polymeric materials, the glass transition temperature range is on the order of 20 degrees C. (see curve labeled 100/0 in FIG. 1). This temperature range is where the polymeric material provides its maximum acoustic damping, however, it frequently occurs at temperatures which are either lower or higher than the temperature range in which a high degree of acoustic damping is desired from an applications standpoint. Efforts have therefore been made to broaden the glass transition temperature range and to shift it to a designated temperature range such that a high degree of acoustic damping is achieved at temperatures at which acoustic damping ordinarily is low. The present invention provides a viscoelastic material interpenetrating polymer network having a broadened glass transition temperature range and, therefore, improved acoustic damping over a broad range of temperatures (see curves labeled 70/30, 60/40 and 50/50 in FIG. 1). Furthermore, by adjusting the relative weight percentages of the polymer components, the temperature range over which maximum acoustic damping is achieved can be varied to a desired temperature level (see FIG. 1).

The ability of viscoelastic materials to dampen noise and vibration is related to their complex Young's modulus $$E^* = E' + iE'',$$

where $E'$ is the real, elastic, or in-phase modulus, and $E''$ is the imaginary, viscous, loss, or out-of-phase modulus; $i = \sqrt{-1}$. A measure of the mechanical energy dissipation as heat in a viscoelastic material is the ratio $E''/E'$, which is also referred to as the damping factor, tangent delta. It is experimentally determined at 10 Hz with a mechanical thermal analyzer, such as the Polymer Laboratory Dynamic Mechanical Thermal Analyzer. All polymer systems exhibit a maximum value for tan delta, and hence maximum vibration damping, at their glass transition temperature.

Interpenetrating polymer networks are chemically dissimilar cross-linked polymer chains which have substantially no chemical bonding between them. They are prepared by allowing two sets of polymer precursors to polymerize in each other's presence, either simultaneously or sequentially, whereby two cross-linked polymer networks form which are intimately entangled with each other on a molecular scale.

It has now been found that, by the choice of appropriate polymer components and polymer component ratios, interpenetrating polymer networks may be produced whose glass transition temperature range is broadened and shifted to a preferred temperature range. Such interpenetrating polymer networks, as for example the interpenetrating polymer networks of the present invention, have increased damping factors in the temperature range in which they are to be used for acoustic damping.

The object of this invention therefore is to provide interpenetrating polymer networks having novel compositions, broadened glass transition temperature ranges, and increased acoustic damping factors in designated temperature ranges. The invention provides a tunable interpenetrating polymer network acoustic damping material exhibiting superior acoustic damping properties from a low temperature to a high temperature without the necessity of changing polymer components for different uses at different temperatures. A further object of this invention is to provide processes for preparing such interpenetrating polymer networks.

One component of the interpenetrating polymer networks of this invention is a soft polymer, and the other component is a hard polymer. The soft polymer component of the interpenetrating polymer network of this invention is a polyurethane prepared from one or several diisocyanates and a polyalkylene ether glycol, cross-linked using a polyol. The diisocyanates most commonly used are 4,4'-diphenylmethane diisocyanate, and 2,4 and 2,6-toluene diisocyanate, the latter two most commonly as an isomer mixture. Polyalkylene ether glycols such as polyethylene ether glycols, polpropylene ether glycols, and poly tetramethylene ether glycols may be used, the latter, with a molecular weight between about 650 and about 2000, being preferred. Polyurethane prepolymers made from aromatic diisocyanates and polyalkylene glycol ethers may be used. The polyurethane precursors are polymerized in the presence of their chain extender and cross-linking agent. As a chain extender, 1,4-butanediol is preferred. Cross-linking is achieved by the addition of 1,1,1-trimethylol propane.

The hard polymer component of the interpenetrating polymer network of this invention is made by polymerization of alkyl esters and alkylene diesters of ethylenically unsaturated carboxylic acids, such as acrylic and methacrylic acid. Alkyl esters include methyl, ethyl, n-propyl, isopropyl, n-butyl, sec-butyl, isobutyl, tert-butyl, and amyl esters. Alkylene diesters include ethylene, propylene, and tetramethylene glycol diesters. The preferred esters are n-butyl methacrylate and tetramethylene glycol dimethacrylate. The term acrylic polymer as used herein denotes polymers made from alkyl esters and alkylene diesters of acrylic and methacrylic acid, and any mixture thereof.

The acrylic polymer precursors are polymerized in the presence of promoters and curing agents, such as dimethyl aniline and benzoyl peroxide. The mixture is then cured at room temperature for 12 to 20 hours, 16 hours being preferred.

The interpenetrating polymer network of this invention has an extended glass transition range when the weight percentage of soft polymer component ranges from 50 to 90, and that of the hard polymer component ranges from 50 to 10. Broadened glass transition temperature is achieved by virtue of the acrylic polymer being cross-linked in the presence of polyurethane, but without chemical interference by the polyurethane, to produce microphase separation between the polyurethane and acrylic components. The polyurethane precursors are polymerized in the presence of their chain extender and cross-linking agent and the acrylic polymer precursors are polymerized in the presence of their promoter and curing agent, however, no cross-linking results between the polyurethane and the acrylic polymer. This result produces a morphology of polymer networks with microphase domains and entanglement on a molecular scale that produce broad glass transition temperatures. The results is a polyurethane/acrylic interpenetrating polymer network having superior acoustic damping characteristics over a broad temperature range. Thus the invention allows damping from a low temperature to a high temperature without the necessity of changing materials for different uses in different temperature ranges.

DESCRIPTION OF PREFERRED EMBODIMENTS OF THE INVENTION

Figure 1:
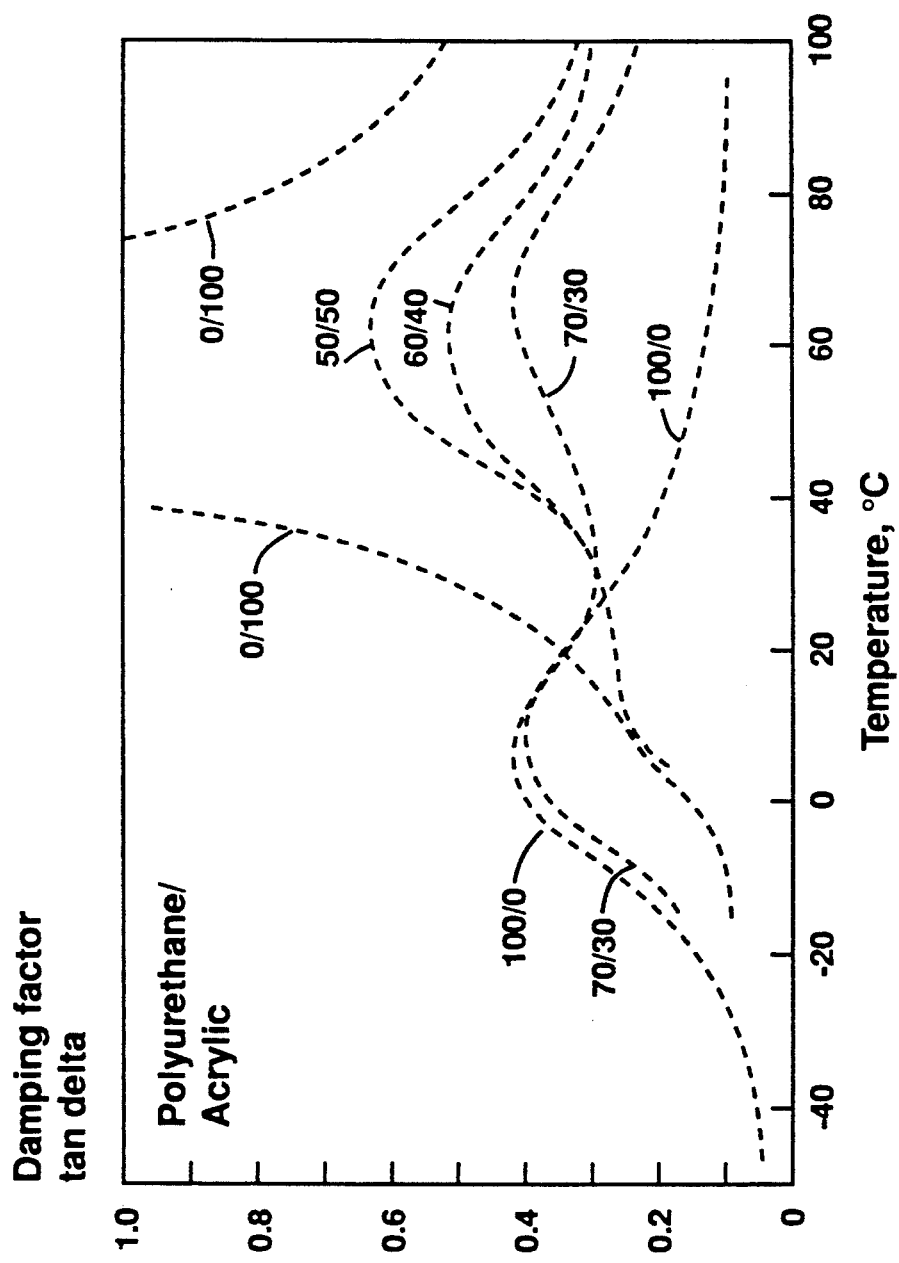
FIG. 1 illustrates the damping factor, tangent delta, as a function of temperature, for interpenetrating polymer networks according to this invention as well as that of pure polyurethane and pure acrylic polymer.

In the following detailed description of the preferred embodiments of this invention, the following abbreviations will be used to identify the materials used:

M-400, Adiprene M-400, a prepolymer of 4,4'-diphenylmethane diisocyanate with polytetramethylene ether glycol having a molecular weight of about 1000, Uniroyal Chemicals
BDO, 1,4-butanediol, DuPont
TMP, 1,1,1-trimethylolpropane
NBMA, n-butyl methacrylate monomer, Polysciences
TEGDM, tetramethylene glycol dimethacrylate, Polysciences
DMA, dimethyl aniline, Ashland Chemical
L-98, Lupersol-98, benzoyl peroxide, Lucidol Pennwalt

EXAMPLE 1

This example illustrates the preparation of pure acrylic polymer 25 parts of NBMA and 0.63 parts of TEGDM are mixed and stirred for about one minute. 0.26 of DMA are added, and stirring is continued for one minute. 0.5 parts of L-98 are added with vigorous stirring, which continues until the L-98 has dissolved in the mixture. The mixture is then poured into a mold and cured at 40 degrees C. for from 12 to 20 hours, 16 hours being preferred. The damping factor, tan delta, as a function of temperature for pure acrylic polymer is shown in FIG. 1 as 0/100.

EXAMPLE 2

This example illustrates the preparation of pure polyurethane polymer. 100 parts of M-400 are heated to 100–110 degrees C. and held under vacuum for an hour to remove moisture and dissolved air. The mixture is cooled to 60 degrees C. and 0.9 parts of TMP are added. The mixture is cooled to 50 degrees C. and 6.3 parts of BDO are added. The mixture is agitated and held under vacuum for five minutes. It is then poured into a mold and allowed to cure at room temperature for 12 to 20 hours, 16 hours being preferred. The damping factor, tan delta, as a function of temperature for pure polyurethane polymer is shown in FIG. 1 as 100/0. It peaks at about 5 degrees C. and is below 0.2 over most of the temperature range shown.

EXAMPLE 3

This example illustrates the preparation of an interpenetrating polymer network in accordance with this invention having a soft polymer component (polyurethane) content of 70 percent by weight. In a first vessel, 100 parts of M-400 are heated to 100–110 degrees C. and held under vacuum for an hour to remove moisture and dissolved air. The mixture is cooled to 70 degrees C. and 0.9 parts of TMP are added with agitation. The mixture is cooled to 60 degrees C. and 6.3 parts of BDO are added with agitation, which continues for at least two minutes.

In a second vessel, 43.9 parts of NBMA and 1.02 parts of TEGDM are combined with mixing, 0.44 parts of DMA are added with continuing mixing, and 0.87 parts of L-98 are added with further mixing. The contents of the second vessel are now poured into the contents of the first vessel with vigorous stirring, and the mixture is held under vacuum for at least eight minutes. The mixture is poured into a mold and allowed to cure at room temperature for from 12 to 20 hours, 16 hours being preferred. The damping factor, tan delta, as a function of temperature for this interpenetrating polymer network is shown in FIG. 1 as 70/30. It is seen to have a value above 0.2 from about −15 degrees C. to 100 degrees C. The invention, thus, provides good acoustic damping over a very broad temperature range.

EXAMPLES 4, 5, 6, and 7

Interpenetrating polymer networks having 90, 80, 60 and 50 percent by weight of soft polymer component (polyurethane) are prepared as described in Example 3 with the proportions of polyurethane precursors (M-400, TMP, and BDO) to acrylic polymer precursors (NBMA, TEGDM, DMA, and L-98) appropriately modified.

Other modifications of this invention will be apparent to those skilled in the art, all falling within the scope of the invention as described herein and claimed in the following claims.

What is claimed is:

1. An improved acoustic damping material, comprising:
    an interpenetrating polymer network having a soft polymer component made of polyurethane and a hard polymer component made of an acrylic polymer in a predetermined ratio of soft polymer component to hard polymer component such that the soft polymer component content is from about 50 to about 90 percent by weight and the hard polymer component content is from about 50 to about 10 percent by weight;
    wherein said polyurethane is made by polymerization of an aromatic diisocyanate and a polyalkylene ether glycol in the presence of 1,4-butanediol and 1,1,1-trimethylol propane, said aromatic diisocyanate being selected from the group consisting of 4,4'-diphenylmethane diisocyanate, 2,4-toluene diisocyanate, 2,6-toluene diisocyanate, and any mixture thereof, and said polyalkylene ether glycol being selected from the group consisting of polyethylene ether glycol, polypropylene ether glycol, and polytetramethylene ether glycol, said polytetramethylene ether glycol having a molecular weight between about 650 and about 2000; and
    wherein said acrylic polymer is made by polymerization of the alkyl ester of an ethylenically unsaturated carboxylic acid and the alkylene diester of an ethylenically unsaturated carboxylic acid in the presence of dimethyl aniline and benzoyl peroxide, said ethylenically unsaturated carboxylic acid being selected from the group consisting of acrylic acid and methacrylic acid, said alkyl ester being selected from the group consisting of methyl, ethyl, n-propyl, isopropyl, n-butyl, sec-butyl, isobutyl, tert-butyl, and amyl ester, and said alkylene diester being selected from the group consisting of ethylene, propylene, and tetramethylene glycol diester.

2. A process for making an improved acoustic damping material comprising an interpenetrating polymer network having a soft polymer component made of polyurethane polymer and a hard polymer component made of acrylic polymer, comprising the steps of:
    measuring in a predetermined ratio the constituents of said soft polymer component and said hard polymer component, wherein said constituents of said soft polymer component comprise a polyurethane prepolymer, 1,1,1-trimethylol propane and 1,4-butanediol, and said constituents of said hard polymer component comprise an alkyl ester of an ethylenically unsaturated carboxylic acid, an alkylene diester of an ethylenically unsaturated carboxylic acid, dimethyl aniline and benzoyl peroxide, such that said soft polymer component content is about 70 percent by weight and said hard polymer component content is about 30 percent by weight;
    in a first vessel, drying and degassing about 100.0 parts of said polyurethane prepolymer by heating it to 100–110 degrees C. under vacuum;
    cooling said polyurethane prepolymer to about 60 degrees C. and adding about 0.9 parts of said 1,1,1-trimethylol propane with agitation;
    cooling the mixture to about 50 degrees C. and adding about 6.3 parts of said 1,4-butanediol with agitation;
    in a second vessel, mixing about 43.9 parts of said alkyl ester of an ethylenically unsaturated carboxylic acid with about 1.0 parts of said alkylene diester of an ethylenically unsaturated carboxylic acid, about 0.44 parts of said dimethyl aniline, and about 0.87 parts of said benzoyl peroxide with agitation;
    pouring the contents of the second vessel into the contents of the first vessel with agitation;
    holding the resulting mixture under vacuum for at least eight minutes;
    pouring said resulting mixture into a mold; and
    letting said resulting mixture cure for about 12 to about 20 hours at room temperature.

3. A process in accordance with claim 2 in which the polyurethane prepolymer is made from an aromatic diisocyanate selected from the group consisting of 4,4'-diphenylmethane diisocyanate, 2,4-toluene diisocyanate, 2,6-toluene diisocyanate, and any mixture thereof, and a polyalkylene ether glycol.

4. A process in accordance with claim 3 in which the polyalkylene ether glycol is selected from the group consisting of polyethylene ether glycol, polypropylene ether glycol, and polytetramethylene ether glycol.

5. A process in accordance with claim 3 in which the polytetramethylene ether glycol has a molecular weight between about 650 and about 2000.

6. A process in accordance with claim 2 in which the ethylenically unsaturated carboxylic acid is selected from the group consisting of acrylic acid and methacrylic acid.

7. A process in accordance with claim 2 in which the alkyl ester is selected from the group consisting of methyl, ethyl, n-propyl, isopropyl, n-butyl, sec-butyl, isobutyl, tert-butyl, and amyl ester.

8. A process in accordance with claim 2 in which the alkylene diester is selected from the group consisting of ethylene, propylene, and tetramethylene glycol diester.

* * * * *